(12) United States Patent
Zhang et al.

(10) Patent No.: US 12,052,154 B2
(45) Date of Patent: Jul. 30, 2024

(54) INTERNET OF THINGS DEVICE MONITORING METHOD, SERVER, AND INTERNET OF THINGS DEVICE

(71) Applicants: Gree Electric Appliances, Inc. of Zhuhai, Guangdong (CN); Leayun Technology Co., Ltd. of Zhuhai, Guangdong (CN)

(72) Inventors: Ming Zhang, Guangdong (CN); Dechao Song, Guangdong (CN); Yuanzhao Wang, Guangdong (CN); Zhijian Zhen, Guangdong (CN); Xiaoze Zhou, Guangdong (CN)

(73) Assignees: Gree Electric Appliances, Inc. of Zhuhai, Zhuhai (CN); Leayun Technology Co., Ltd. of Zhuhai, Zhuhai (CN)

( * ) Notice: Subject to any disclaimer, the term of this patent is extended or adjusted under 35 U.S.C. 154(b) by 0 days.

(21) Appl. No.: 18/039,912

(22) PCT Filed: Nov. 2, 2021

(86) PCT No.: PCT/CN2021/128067
§ 371 (c)(1),
(2) Date: Jun. 1, 2023

(87) PCT Pub. No.: WO2022/116760
PCT Pub. Date: Jun. 9, 2022

(65) Prior Publication Data
US 2024/0022493 A1 Jan. 18, 2024

(30) Foreign Application Priority Data
Dec. 4, 2020 (CN) .......................... 202011408027.6

(51) Int. Cl.
*H04L 12/70* (2013.01)
*H04L 41/12* (2022.01)
(Continued)

(52) U.S. Cl.
CPC .............. *H04L 43/10* (2013.01); *H04L 41/12* (2013.01); *H04L 67/12* (2013.01)

(58) Field of Classification Search
CPC ......... H04L 43/10; H04L 41/12; H04L 67/12; H04L 67/1044; G16Y 40/20; G16Y 20/20; G16Y 10/75
(Continued)

(56) References Cited

U.S. PATENT DOCUMENTS 8,745,245 B1 6/2014 Bullock
2008/0261521 A1 10/2008 Berndt et al.
(Continued)

FOREIGN PATENT DOCUMENTS

CN 102761454 A 10/2012
CN 106385410 A 2/2017
(Continued)

OTHER PUBLICATIONS

International Search Report, with a mailing date of Jan. 26, 2022, in International application No. PCT/CN2021/128067, filed on Nov. 2, 2021 (5 pages).
(Continued)

*Primary Examiner* — Ario Etienne
*Assistant Examiner* — Elizabeth Kassa
(74) *Attorney, Agent, or Firm* — McAndrews, Held & Malloy, Ltd.

(57) ABSTRACT

The Internet of Things device monitoring method includes that: device information of each of a plurality of online Internet of Things devices present in any one of the plurality of constructed Internet of Things device groups is acquired; group ring information is generated according to the device information of each of the plurality of the online Internet of Things devices; the group ring information is sent to the plurality of online Internet of Things devices offline device sent by any one of the plurality of the online Internet of Things devices in the online Internet of Things device ring, offline detection data is sent to each of the plurality of the
(Continued)

online Internet of Things devices in the online Internet of Things device ring; and an actual offline Internet of Things device in the online Internet of Things device ring is determined according to response data corresponding to the offline detection data.

19 Claims, 6 Drawing Sheets

(51) Int. Cl.
*H04L 43/10* (2022.01)
*H04L 67/12* (2022.01)

(58) Field of Classification Search
USPC .......................................................... 709/224
See application file for complete search history.

(56) References Cited

U.S. PATENT DOCUMENTS

| | | | | |
|---|---|---|---|---|
| 2015/0072674 | A1* | 3/2015 | Shoemaker | ......... H04L 12/2829 455/420 |
| 2016/0374134 | A1* | 12/2016 | Kweon | ................. H04W 12/06 |
| 2018/0375887 | A1 | 12/2018 | Dezent et al. | |
| 2019/0182105 | A1 | 6/2019 | Stephens et al. | |
| 2019/0349426 | A1 | 11/2019 | Smith et al. | |
| 2021/0203491 | A1* | 7/2021 | Wei | ..................... H04W 12/043 |

FOREIGN PATENT DOCUMENTS

| | | | | | |
|---|---|---|---|---|---|
| CN | 106817428 | A | | 6/2017 | |
| CN | 109150560 | A | * | 1/2019 | ......... H04L 41/0803 |
| CN | 111464402 | A | | 7/2020 | |
| CN | 111769978 | A | * | 10/2020 | ........... H04L 41/069 |
| CN | 111769978 | A | | 10/2020 | |
| CN | 112637000 | A | | 4/2021 | |
| CN | 113411832 | A | * | 9/2021 | |

OTHER PUBLICATIONS

Chinese Search Report, with a mailing date of Dec. 3, 2021, in Chinese application No. CN 202011408027.6, filed on Dec. 4, 2020 (3 pages).

The extended European search report for Application No. 21899794.8, dated Feb. 27, 2024, European Patent Office, Germany (11 pages).

* cited by examiner

INTERNET OF THINGS DEVICE MONITORING METHOD, SERVER, AND INTERNET OF THINGS DEVICE

CROSS-REFERENCE TO RELATED APPLICATIONS

The present disclosure is a 371 of International Patent Application No. PCT/CN2021/128067, filed Nov. 2, 2021, which claims priority to Chinese patent application No. 202011408027.6, filed to the China National Intellectual Property Administration on Dec. 4, 2020 and entitled "Internet of Things Device Monitoring Method, Server, and Internet of Things Device", the disclosures of which is are hereby incorporated by reference in their entireties.

TECHNICAL FIELD

The present disclosure belongs to the technical field of Internet of Things, and specifically relates to an Internet of Things device monitoring method, a server, and an Internet of Things device.

BACKGROUND

In practical application of Internet of Things devices such as leased devices and smart home devices, unexpected situations (such as power failure, module damage) may occur to cause the devices to go offline abnormally, so how to detect whether the Internet of Things devices go offline abnormally becomes very important.

Usually, the problem of detecting whether the Internet of Things devices go offline abnormally is solved by sending heartbeat packets to a server by the Internet of Things devices. However, when there are a large number of the Internet of Things devices, the server will receive a large amount of information to cause network congestion, large server resource occupation and other bad conditions, resulting in low detection efficiency.

SUMMARY

The present disclosure provides an Internet of Things device monitoring method, which may include the following operations.

Device information of each of a plurality of online Internet of Things devices present in any one of a plurality of constructed Internet of Things device groups is acquired.

Group ring information is generated according to the device information of each of the plurality of the online Internet of Things devices.

The group ring information is sent to the plurality of the online Internet of Things devices, so that the plurality of the online Internet of Things devices generate an online Internet of Things device ring according to the group ring information.

In a case that a notification of presence of an offline device sent by any one of the plurality of the online Internet of Things devices in the online Internet of Things device ring, offline detection data is sent to each of the plurality of the online Internet of Things devices in the online Internet of Things device ring.

An actual offline Internet of Things device in the online Internet of Things device ring is determined according to response data corresponding to the offline detection data.

The present disclosure also provides an Internet of Things device monitoring method, which may include the following operations.

Each of a plurality of online Internet of Things devices present in any one of a plurality of constructed Internet of Things device groups receives group ring information sent by a server.

Each of the plurality of the online Internet of Things devices generates an online Internet of Things device ring according to the group ring information.

Any one of the plurality of the online Internet of Things devices in the online Internet of Things device ring detects whether an online Internet of Things device adjacent to any one of the plurality of the online Internet of Things devices is disconnected or connected, and in a case that it is disconnected, generates a notification of the presence of an offline device.

Any one of the plurality of the online Internet of Things device sends the notification of the presence of an offline device to the server, so that the server sends offline detection data to each of the plurality of the online Internet of Things devices in the online Internet of Things device ring, and determines an actual offline Internet of Things device in the online Internet of Things device ring according to response data corresponding to the offline detection data.

The present disclosure also provides a server, which may include a memory device and a controller.

The memory device stores a computer program. When executed by the controller, the computer program implements steps of the Internet of Things device monitoring method described above.

The present disclosure also provides an Internet of Things device, which may include a memory and a controller.

The memory stores a computer program. When executed by the controller, the computer program implements steps of the Internet of Things device monitoring method described above.

BRIEF DESCRIPTION OF THE DRAWINGS

The accompanying drawings are used for providing further understanding of the present disclosure, and constitute a part of the specification. The accompanying drawings are used for illustrating the present disclosure together with the embodiments of the present disclosure, and not intended to form a limit to the present disclosure. In the accompanying drawings.

DETAILED DESCRIPTION OF THE EMBODIMENTS

The implementation modes of the present disclosure are described in detail below in combination with the accompanying drawings and embodiments, so that the implementation process of the present disclosure about how to apply technical means to solve technical problems and achieve technical effects can be fully understood and implementation can be performed accordingly. It is to be noted that, as long as there is no conflict, the embodiments in the present disclosure and the characteristics in the embodiments can be combined with each other, and the formed technical solutions are within the protection scope of the present disclosure.

Embodiment 1

In order to solve the above technical problems, an embodiment of the present disclosure provides an Internet of Things device monitoring method.

Figure 1:
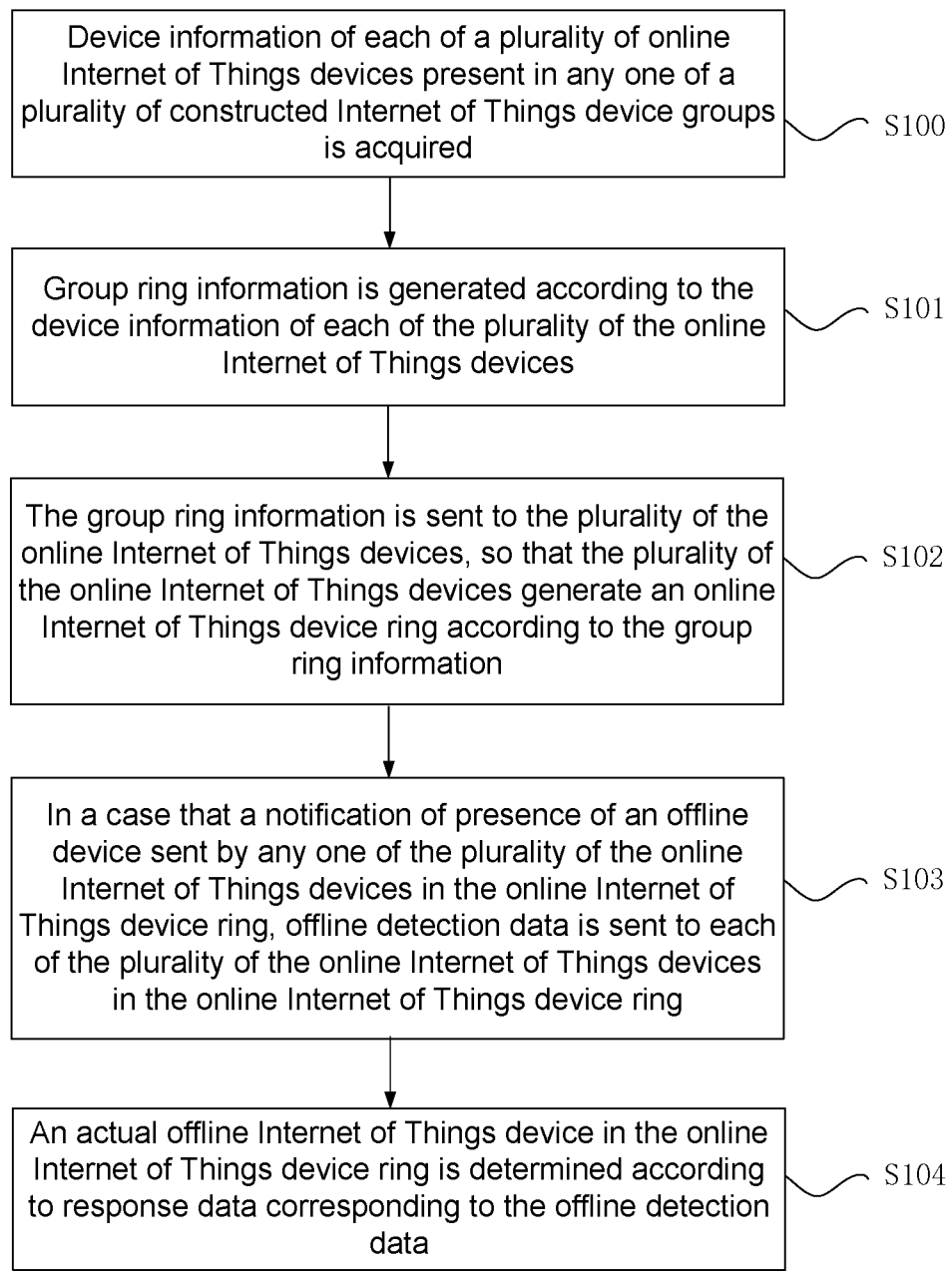
FIG. 1 is a flowchart of an embodiment of an Internet of Things device monitoring method in the present disclosure.

FIG. 1 is a flowchart of an embodiment of an Internet of Things device monitoring method in the present disclosure. As shown in FIG. 1, the Internet of Things device monitoring method of the present embodiment may specifically include the following steps.

At S100, device information of each of a plurality of online Internet of Things devices present in any one of a plurality of the constructed Internet of Things device groups is acquired.

In a specific embodiment, a constructing process of an Internet of Things device group may include the following steps.

At S1, a device set sent by each of the plurality of the Internet of Things devices which are monitored is received.

In the present embodiment, the device set sent by each of the plurality of the Internet of Things devices which is monitored may include the Internet of Things device which is monitored corresponding to the device set and other Internet of Things devices which are monitored capable of matching each of the plurality of the Internet of Things devices which are monitored.

Specifically, because each of the plurality of the Internet of Things devices which are monitored are connected through a network communication module, we need to consider the following factors.

The first factor is a distance, that is, the connection between two network communication modules is limited by a distance. For example, an available network communication module is a Wireless-Fidelity (WiFi) module, and the maximum communication distance between two WiFi modules is 10 meters, in this case, under the condition that the distance between two WiFi modules is less than 10 meters, it is considered that the two communication modules can be connected to each other; on the contrary, under the condition that the distance between two WiFi modules is greater than or equal to 10 meters, it is considered that the two communication modules cannot be connected to each other. Therefore, a factor that two Internet of Things devices which are monitored match each other is that the communication distance between the communication modules used by the two devices is less than the maximum distance allowed for mutual connection.

The second factor is the number of connections, that is, the network communication module is often limited by the maximum number of connections in consideration of its network communication capability and efficiency. For example, the network communication module used in the present embodiment is the WiFi module, the maximum number of connections of the WiFi module is 5, and all the Internet of Things devices which are monitored A to D meet the requirement for distance in the distance factor. Link information of the Internet of Things devices which are monitored A to D is shown in Table 1.

TABLE 1

| Internet of Things Devices which are monitored | A | B | C | D |
|---|---|---|---|---|
| The number of existing connections | 0 | 3 | 4 | 5 |
| The number of idle connections | 5 | 2 | 1 | 0 |

According to the above assumptions, it can be known that:

A can be connected to B, because after A is connected to B, the number of existing connections of A is 1, the number of existing connections of B is 4, and the number of existing connections of both A and B does not exceed 5.

A can be connected to C for the same reason as above.

B can be connected to C for the same reason as above.

A cannot be connected to D, because the number of existing connections of D is 5, in a case that it is connected to the other device, the number of connections is 5+1, which exceeds the maximum number of connections 5.

Since A can be connected to B, A can be connected to C, and B can be connected to C, can A, B, and C form a group?

No, because C has only one idle connection remained, A can be connected to only one of B and C, but cannot be connected to both B and C.

Therefore, based on the above example, the factor of the number of connections for the mutual matching between leased devices needs to satisfy the following conditions:

a, the number of established connections of the current device is less than the maximum number of connections of the communication module; and b, the number of devices in a group is less than the maximum number of devices that a single device can be connected to (the maximum number of connections). When the number of devices in a group is greater than the maximum number of devices that a single device can be connected to, a situation where A, B, and C cannot be connected at the same time in the example will occur, so in order to avoid the situation, the number of devices in a group is directly limited. Because no group is established at this point, the limit is on the establishment of a group.

In the present embodiment, after the above factors are taken into consideration, the device set corresponding to each of the plurality of the Internet of Things devices which are monitored can be acquired. For example, the maximum number of connections that the network communication module can establish is 3, there are five Internet of Things devices which are monitored A1 to E1, A1 can be connected to B1, C1 and D1, B1 can be connected to C1, D1, and E1, C1 can be connected to A1, E1 and D1, D1 can be connected to A1, B1, and E1, and E1 can be connected to A1, C1, and D1. Then, the sets $S_i$ for A1, B1, C1, D1 and E1 acquired in the present embodiment (the sets include the device itself) are as follows:

$$S_{A1}=\{A1,B1,C1,D1\}; S_{B1}=\{B1,C1,D1,E1\}; S_{C1}=\{C1, A1,D1,E1\}; S_{D1}=\{D1,A1,B1,E1\}; \text{ and } S_{E1}=\{E1, A1,C1,D1\}.$$

At S2, according to preset grouping rules, the device set corresponding to each of the plurality of the Internet of Things devices which are monitored is processed, and all the Internet of Things devices which are monitored are divided into one or more Internet of Things device groups.

Specifically, according to the preset maximum number of devices M in each of the plurality of the Internet of Things device groups, the sets which containing M devices may be successively selected to acquire an intersection corresponding to the sets which containing M devices, until all the sets are traversed; and after the intersection satisfying a grouping condition is selected, one or more the Internet of Things device groups are acquired according to the principle of not repeating grouping. Satisfying the grouping condition is: the intersection corresponding to the sets which containing M devices includes the Internet of Things device which is monitored corresponding to the sets containing M devices. M is an integer and M is greater than or equal to 2.

For example, a maximum of two Internet of Things devices are allocated to one Internet of Things device group, and the following results can be acquired.

$S_{A1} \cap S_{B1}$={B1, C1, D1}, not containing A1, so the grouping condition is not satisfied.

$S_{A1} \cap S_{C1}$={A1, C1, D1}, containing both A1 and C1, so the grouping condition is satisfied.

$S_{A1} \cap S_{D1}$={A1, D1, B1}, containing both A1 and D1, so the grouping condition is satisfied.

$S_{A1} \cap S_{E1}$={m, C1, D1}, not containing E1, so the grouping condition is not satisfied.

$S_{B1} \cap S_{C1}$={C1, D1, E1}, not containing B1, so the grouping condition is not satisfied.

$S_{B1} \cap S_{D1}$={B1, D1, E1}, containing both B1 and D1, so the grouping condition is satisfied.

$S_{B1} \cap S_{E1}$={C1, D1, E1}, not containing B1, so the grouping condition is not satisfied.

$S_{C1} \cap S_{D1}$={A1, D1, E1}, not containing C1, so the grouping condition is not satisfied.

$S_{C1} \cap S_{E1}$={A1, C1, D1, E1}, containing both C1 and E1, so the grouping condition is satisfied.

$S_{D1} \cap S_{E1}$={A1, D1, E1}, containing both D1 and E1, so the grouping condition is satisfied.

Thus, $S_{A1} \cap S_{C1}$={A1, C1, D1}, $S_{A1} \cap S_{D1}$={A1, D1, B1}, $S_{B1} \cap S_{D1}$={B1, D1, E1}, $S_{C1} \cap S_{E1}$={A1, C1, D1, E1}, and $S_{D1} \cap S_{E1}$={A1, D1, E1} may be selected in the present embodiment. The constructed groups are A1C1, B1D1, E1, or A1 D1, C1 E1, B1, etc., and no examples will given here. In the present embodiment, the specific grouping rules can be set by related personnel to acquire N Internet of Things device groups.

In a specific implementation process, after all the Internet of Things devices which are monitored are grouped, in a case that there are a plurality of the online Internet of Things devices in any one of the plurality of the Internet of Things device groups, the device information of each of the plurality of the online Internet of Things devices can be acquired, such as at least one of the following: a tag number (device 1, device 2 . . . ) of the online Internet of Things device, network access time (8:00 am, 9:am . . . ) of the online Internet of Things device.

It is to be noted that, in the present embodiment, in a case that there is an online Internet of Things device in any one of the plurality of constructed Internet of Things device groups, it is only necessary to detect whether the online Internet of Things device goes offline abnormally according to the method in the related art.

At 101, group ring information is generated according to the device information of each of the plurality of the online Internet of Things devices.

In the present embodiment, the online Internet of Things devices may be sorted by at least one of the following: the tag number, the network access time, and a sorting result may be used as the group ring information.

At S102, the group ring information is sent to the plurality of the online Internet of Things devices, so that the plurality of the online Internet of Things devices generate an online Internet of Things device ring according to the group ring information.

After the group ring information is acquired, the group ring information may be sent to the plurality of online Internet of Things devices, so that the plurality of online Internet of Things devices generate the online Internet of Things device ring according to the group ring information.

Specifically, after receiving the group ring information sent by a server, each of the plurality of the online Internet of Things devices may know the device information of its upstream online Internet of Things device and downstream online Internet of Things device, and a loop connection formed by connecting the sorted online Internet of Things device ring end to end may be realized. For example, in a case that there are online Internet of Things devices A2, B2 and C2, then such an online Internet of Things device ring can be formed: B2 only sends messages to A2; A2 only sends messages to C2, and C2 only sends messages to B2. In a case that there are only A2 and B2, then A2 sends messages to B2, and B2 sends messages to A2, forming a loop.

At S103, in a case that a notification of presence of an offline device sent by any one of the plurality of the online Internet of Things devices in the online Internet of Things device ring, offline detection data is sent to each of the plurality of the online Internet of Things devices in the online Internet of Things device ring.

After each of the plurality of the online Internet of Things devices generate the online Internet of Things device ring according to the received group ring information, the online Internet of Things devices in the online Internet of Things device ring keep sending data packets in a loop to monitor the state of the online Internet of Things devices in the ring. For example, in a case that one of the plurality of the online Internet of Things devices does not receive the data packets sent by the upstream online Internet of Things device when the set time is reached, it is considered that the upstream online Internet of Things device goes offline. In this case, the online Internet of Things device may generate a notification of the presence of an offline device and send it to the server; in a case that the server receives the notification of the presence of an offline device sent by any one of the plurality of the online Internet of Things devices in the online Internet of Things device ring, in order to accurately analyze which online Internet of Things device goes offline abnormally, it may send the offline detection data to each of the plurality of the online Internet of Things devices in the online Internet of Things device ring.

At S104, an actual offline Internet of Things device in the online Internet of Things device ring is determined according to response data corresponding to the offline detection data.

In the present embodiment, after the offline detection data is sent to each of the plurality of the online Internet of Things devices in the online Internet of Things device ring, the actual online Internet of Things device can return response data corresponding to the offline detection data, while the actual offline Internet of Things device cannot return the response data corresponding to the offline detection data, and then the actual offline Internet of Things device in the online Internet of Things device ring can be determined.

In the Internet of Things device monitoring method of the present embodiment, the device information of each of the plurality of online Internet of Things devices present in any one of the plurality of constructed Internet of Things device groups is acquired; the group ring information is generated according to the device information of each of the plurality of the online Internet of Things devices; the group ring information is sent to the plurality of online Internet of Things devices, so that the plurality of online Internet of Things devices generate the online Internet of Things device ring according to the group ring information; in a case that the notification of the presence of an offline device sent by any one of the plurality of the online Internet of Things devices in the online Internet of Things device ring, the offline detection data is sent to each of the plurality of the online Internet of Things devices in the online Internet of Things device ring; and the actual offline Internet of Things device in the online Internet of Things device ring is determined according to response data corresponding to the offline detection data; in this way, the detection of the actual offline Internet of Things device in an interrupted state of the online Internet of Things device ring is realized. There is no need for each of the plurality of the online Internet of Things devices to constantly send heartbeat packets to detect whether the Internet of Things device goes offline abnormally, thereby effectively preventing network congestion, large server resource occupation and other bad conditions caused by receiving a large amount of information by the server. The application of the technical solutions of the present disclosure can improve the detection efficiency.

Further, in the above embodiment, the actual online Internet of Things device in the online Internet of Things device ring may also be determined according to the response data of each of the plurality of the online Internet of Things devices to the offline detection data; in a case that the number of the actual online Internet of Things devices is at least two, offline regrouping ring information is generated according to the device information of the actual online Internet of Things devices; and the offline regrouping ring information and the device information of the actual offline Internet of Things device is sent to the actual online Internet of Things devices, so that the actual online Internet of Things devices regroup a ring according to the offline regrouping ring information after eliminating the actual offline Internet of Things device according to the device information of the actual offline Internet of Things device. The offline regrouping ring information is regrouping ring information generated due to the presence of the Internet of Things device going offline abnormally.

In a specific implementation process, any one of the plurality of the online Internet of Things devices in the online Internet of Things device ring may go offline normally due to the operation of an operator; in this case, an Internet of Things device to be offline in the online Internet of Things device ring will send an offline request, in this way, in a case that the offline request sent by the Internet of Things device to be offline in the online Internet of Things device ring is received, the actual online Internet of Things device in the online Internet of Things device ring is determined according to the device information of the Internet of Things device to be offline corresponding to the offline request, that is, because the Internet of Things device goes offline normally and the offline request carries the device information of the related Internet of Things device to be offline, which online Internet of Things device sends the offline request can be directly determined, and thus the actual online Internet of Things device in the online Internet of Things device ring can be determined. In the present embodiment, in a case that the number of the actual online Internet of Things devices is at least two, the offline regrouping ring information is generated according to the device information of the actual online Internet of Things devices; and the offline regrouping ring information and the device information of the Internet of Things device to be offline corresponding to the offline request is sent to the actual online Internet of Things devices, so that the actual online Internet of Things devices regroup a ring according to the offline regrouping ring information after eliminating the Internet of Things device to be offline corresponding to the offline request according to the device information of the Internet of Things device to be offline corresponding to the offline request.

In the practical applications, the server may receive an online request sent by any one of the plurality of the Internet of Things devices which are monitored, in this way, an Internet of Things device group to which the Internet of Things device which is monitored to be online belongs is determined according to the device information of the Internet of Things device which is monitored to be online, and the Internet of Things device which is monitored to be online is converted into the online Internet of Things device; in a case that there are a plurality of online Internet of Things devices in the Internet of Things device group to which the Internet of Things device which is monitored to be online belongs, amplified regrouping ring information is generated according to the device information of the plurality of online Internet of Things devices, so that the plurality of online Internet of Things devices regroup a ring according to the amplified regrouping ring information. The amplified regrouping ring information represents regrouping information generated because other Internet of Things devices which are monitored need to go online. Specifically, because the other Internet of Things devices which are monitored need to go online, the other Internet of Things devices which are monitored that need to go online can be added to the original online Internet of Things device ring; in this case, the amplified regrouping ring information can be generated, and the regrouping of the online Internet of Things device ring can be completed.

In practical applications, all online Internet of Things devices in the online Internet of Things device ring may go offline abnormally due to large-scale power outage and other factors; in this case, no online Internet of Things device informs the server that an Internet of Things device is abnormally offline, and the server does not know that an Internet of Things device is offline. Therefore, in the present embodiment, after the online Internet of Things device ring is generated, an online Internet of Things device is randomly selected as a starting online Internet of Things device, and the starting online Internet of Things device periodically sends state report data to the server. For example, after the online Internet of Things device ring is not interrupted and the number of completed data cycles in the ring reaches 3, the starting online Internet of Things device sends the state report data to the server; in a case that the server does not receive the state report data sent by the starting online Internet of Things device in the online Internet of Things device ring and does not receive the notification of the presence of an offline device, it is determined that all the online Internet of Things devices in the online Internet of Things device ring are converted into offline Internet of Things devices.

For example, a detection period for the server to receive the state report data sent by the starting online Internet of Things device may be set according to the time when the online Internet of Things device ring is not interrupted and the number of completed data cycles in the ring reaches 3; in a case that when the detection period exceeds a threshold corresponding to it, the server does not receive the state report data sent by the starting online Internet of Things device in the online Internet of Things device ring and does not receive the notification of the presence of an offline device, it can be determined that all the online Internet of Things devices in the online Internet of Things device ring are converted into the offline Internet of Things devices.

In the present embodiment, N Internet of Things device groups are constructed. In a case that each of the plurality of the Internet of Things device groups do not form an Internet of Things device ring in the related art, the state report data is sent to the server by a single Internet of Things device. In a case that an Internet of Things device ring is formed in the embodiment of the present disclosure, the amount of state report data sent by the starting online Internet of Things device is much smaller than that sent by all the online Internet of Things devices in the monitoring method of the related art, and the amount of information received by the server is relatively small, so it is less likely to cause network congestion, few server resources are occupied, and the detection efficiency is improved.

For example, there are 100 Internet of Things devices, and 80 Internet of Things devices are online and need to traditionally send 80 heartbeat packets in unit time; in the present disclosure, it is assumed that 100 Internet of Things devices are divided into 10 groups, 80 Internet of Things devices are online, the online Internet of Things devices are distributed in 9 groups, and each group sends 1 packet in unit time, then the 80 Internet of Things devices send 9 packets in unit time, which is far less than the traditional 80 packets.

It is to be noted that the method in the present embodiment of the present disclosure may be performed by a single device, for example, a computer or server. The method in the embodiment may also be applied in a distributed scenario and competed by a plurality of devices cooperating with each other. In such a distributed scenario, one of the plurality of devices may perform only one or more steps of the method in the embodiment of the present embodiment, and the plurality of devices will interact with each other to complete the method.

Embodiment 2

In order to solve the above technical problems, an embodiment of the present disclosure provides an Internet of Things device monitoring method.

Figure 2:
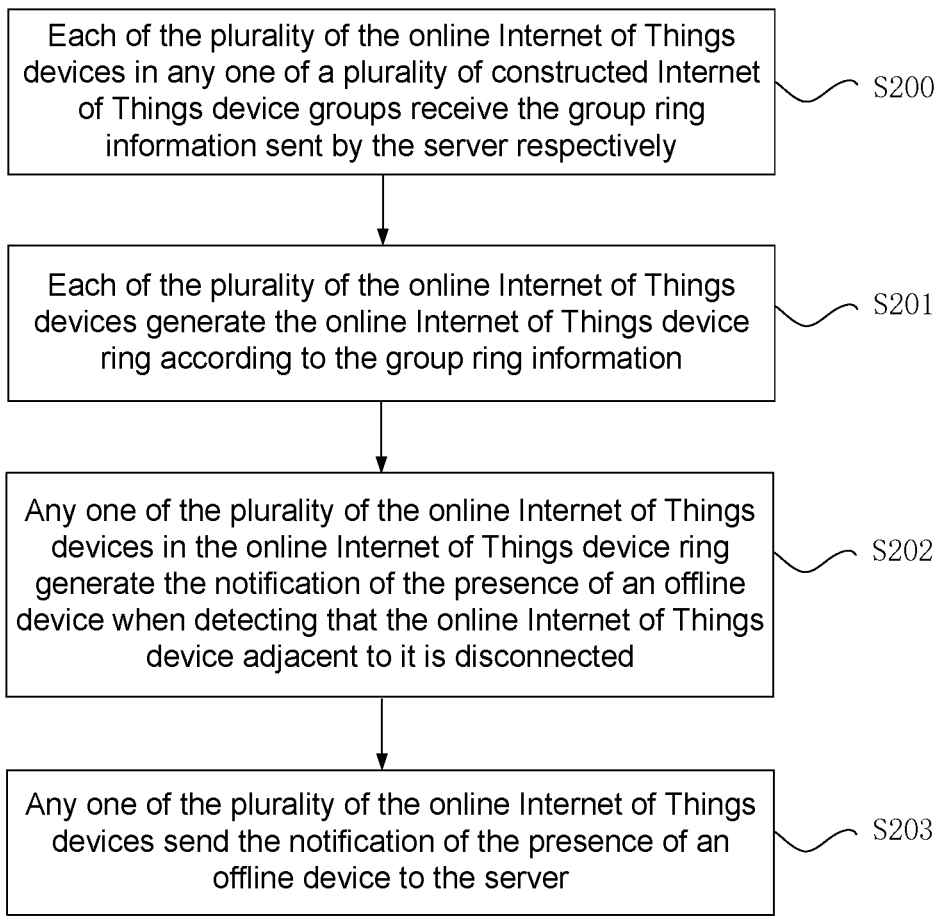
FIG. 2 is a flowchart of another embodiment of an Internet of Things device monitoring method in the present disclosure.

FIG. 2 is a flowchart of another embodiment of an Internet of Things device monitoring method in the present disclosure. As shown in FIG. 2, the Internet of Things device monitoring method of the present embodiment may specifically include the following steps.

At S200, each of the plurality of the online Internet of Things devices in any one of a plurality of constructed Internet of Things device groups receive the group ring information sent by the server respectively.

At S201, each of the plurality of the online Internet of Things devices generate the online Internet of Things device ring according to the group ring information.

At S202, any one of the plurality of the online Internet of Things devices in the online Internet of Things device ring generate the notification of the presence of an offline device when detecting that the online Internet of Things device adjacent to it is disconnected.

At S203, any one of the plurality of the online Internet of Things devices send the notification of the presence of an offline device to the server.

In the present embodiment, in a case that the server receives the notification of the presence of an offline device sent by any one of the plurality of the online Internet of Things devices in the online Internet of Things device ring, it sends the offline detection data to each of the plurality of the online Internet of Things devices in the online Internet of Things device ring, and determines the actual offline Internet of Things device in the online Internet of Things device ring according to the response data corresponding to the offline detection data.

The Internet of Things device monitoring method of the present embodiment is described on the side of the Internet of Things device, and its implementation process may refer to the relevant records of the above embodiment 1 and will not be elaborated here.

The technical solutions of the present disclosure are elaborated below taking a leased device and a leased server as examples.

Figure 3:
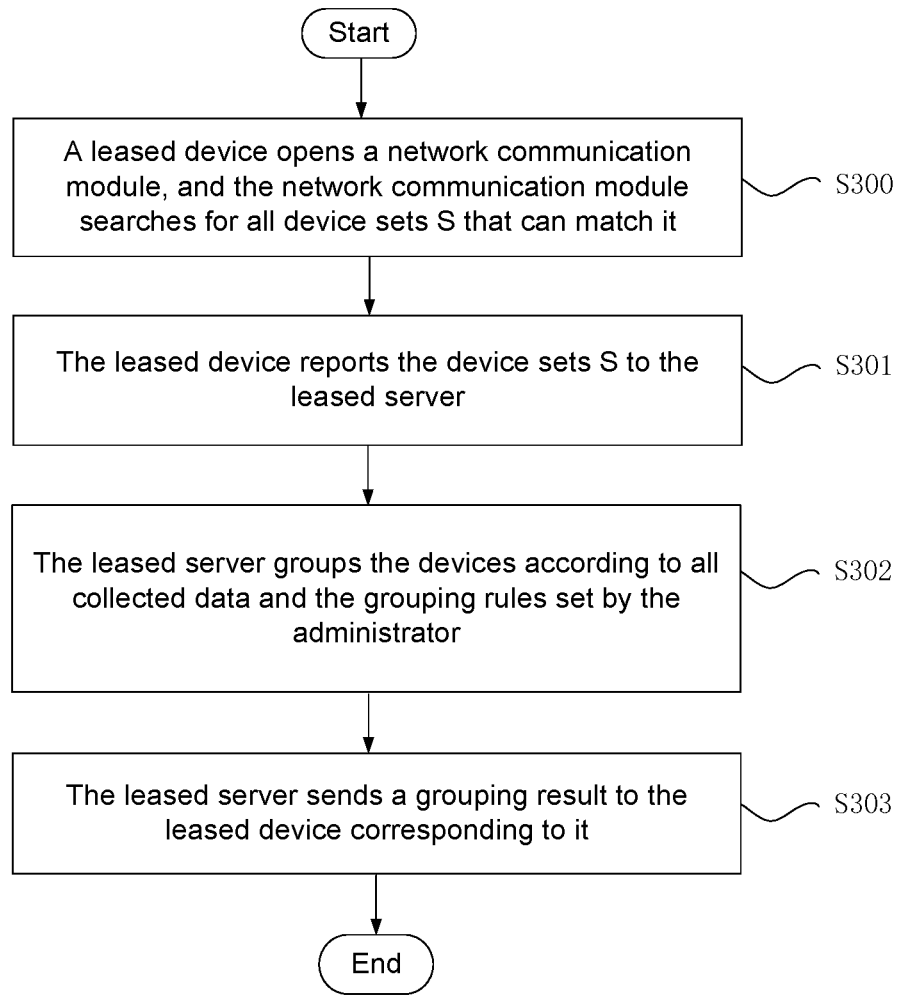
FIG. 3 is a flowchart of a grouping method of a leased device.

FIG. 3 is a flowchart of a grouping method of a leased device, specifically including the following steps.

At S300, a leased device opens a network communication module, and the network communication module searches for all device sets S that can match it.

At S301, the leased device reports the device sets S to the leased server.

At S302, the leased server groups the devices according to all collected data and the grouping rules set by the administrator.

At S303, the leased server sends a grouping result to the leased device corresponding to it.

Figure 4:
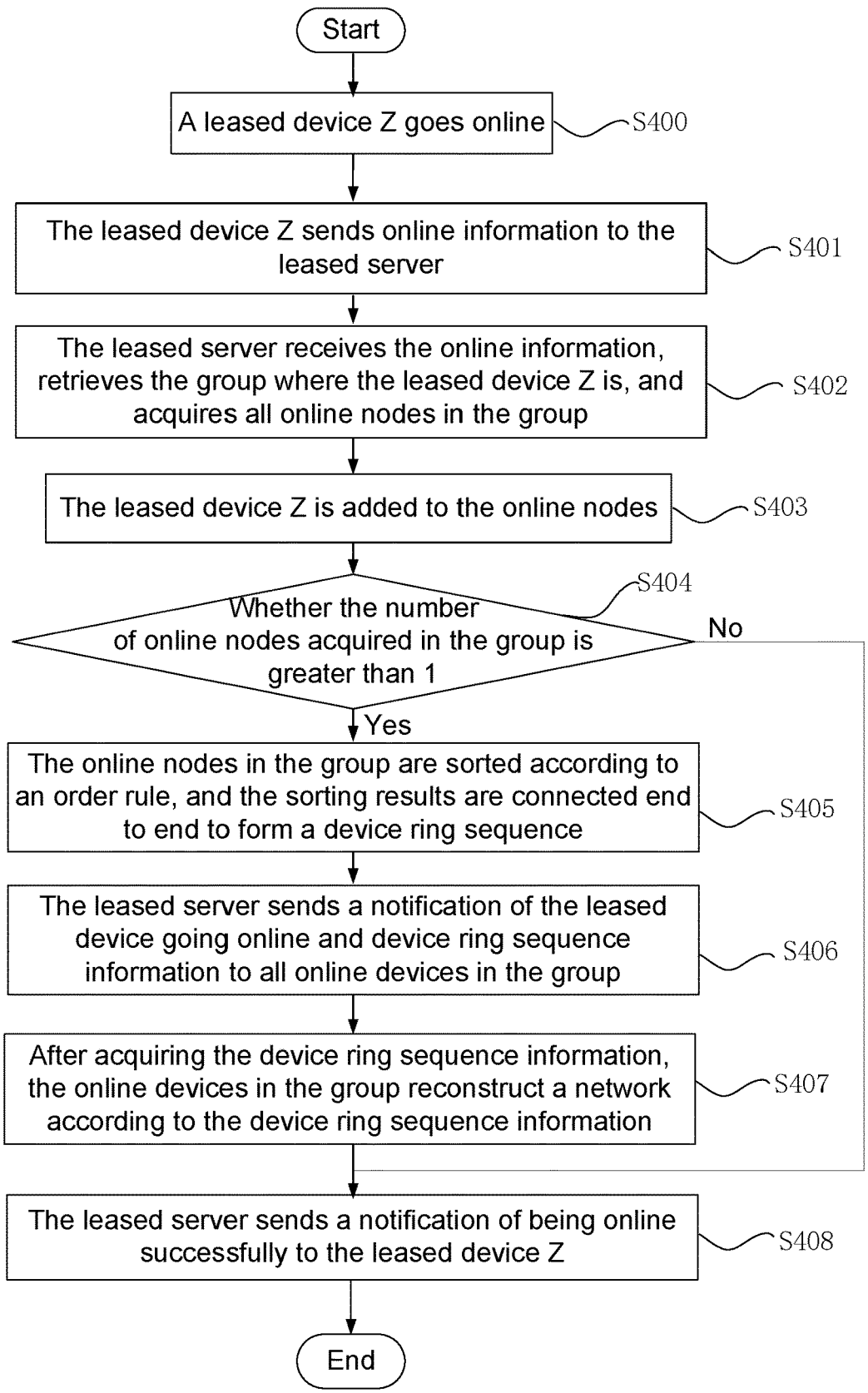
FIG. 4 is a flowchart of a leased device going online.

FIG. 4 is a flowchart of a leased device going online, specifically including the following steps.

At S400, a leased device Z goes online.

At S401, the leased device Z sends online information to the leased server.

At S402, the leased server receives the online information, retrieves the group where the leased device Z is, and acquires all online nodes in the group.

At S403, the leased device Z is added to the online nodes.

At S404, whether the number of online nodes acquired in the group is greater than 1; in a case that yes, S405 is executed, in a case that no, S408 is executed.

At S405, the online nodes in the group are sorted according to an order rule, and the sorting results are connected end to end to form a device ring sequence.

At S406, the leased server sends a notification of the leased device going online and device ring sequence information to all online devices in the group.

At S407, after acquiring the device ring sequence information, the online devices in the group reconstruct a network according to the device ring sequence information.

At S408, the leased server sends a notification of being online successfully to the leased device Z.

Figure 5:
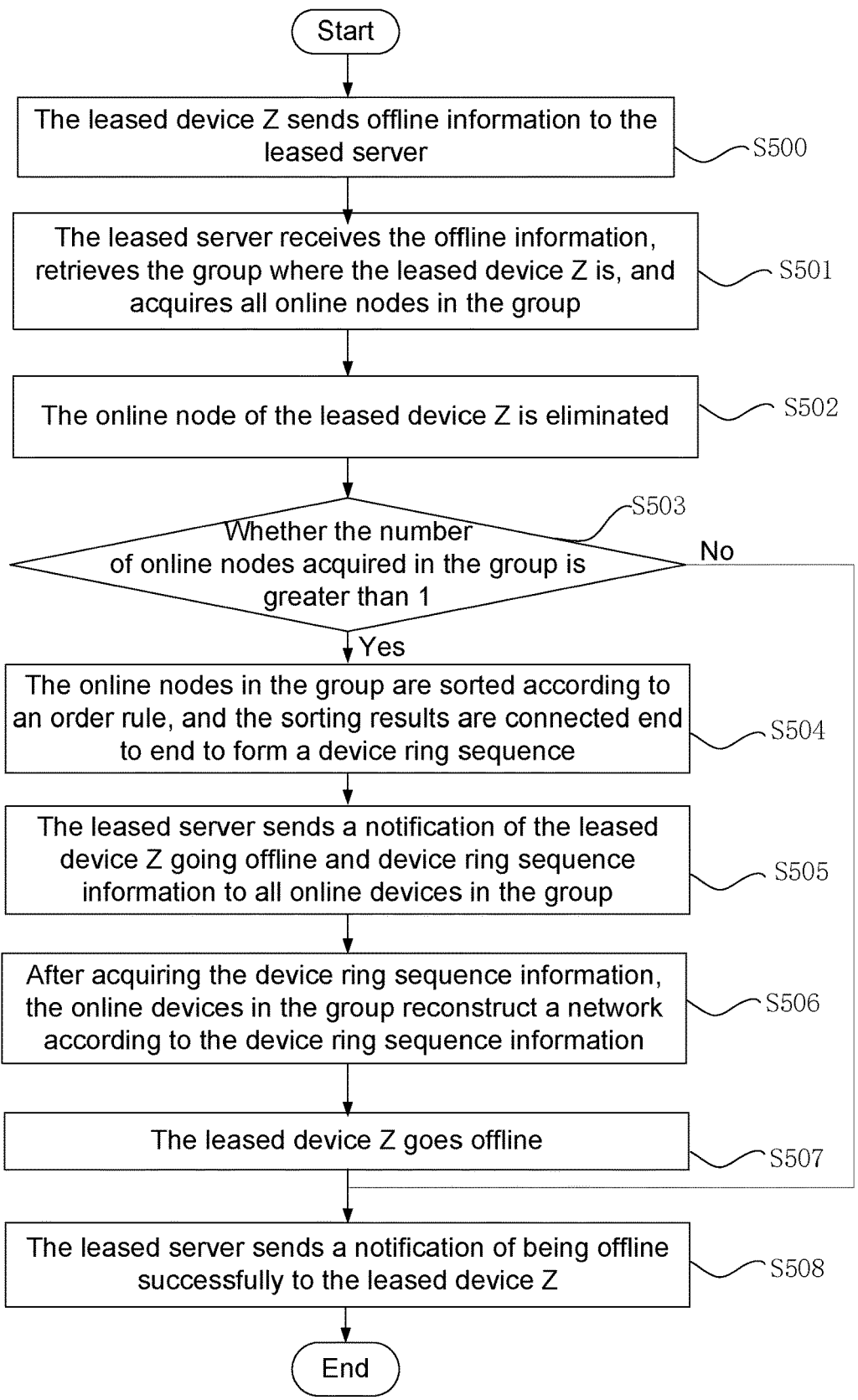
FIG. 5 is a flowchart of a leased device going offline normally.

FIG. 5 is a flowchart of a leased device going offline normally, specifically including the following steps.

At S500, the leased device Z sends offline information to the leased server.

At S501, the leased server receives the offline information, retrieves the group where the leased device Z is, and acquires all online nodes in the group.

At S502, the online node of the leased device Z is eliminated.

At S503, whether the number of online nodes acquired in the group is greater than 1; in a case that yes, S504 is executed, in a case that no, S508 is executed.

At S504, the online nodes in the group are sorted according to an order rule, and the sorting results are connected end to end to form a device ring sequence.

At S505, the leased server sends a notification of the leased device Z going offline and device ring sequence information to all online devices in the group.

At S506, after acquiring the device ring sequence information, the online devices in the group reconstruct a network according to the device ring sequence information.

At S507, the leased device Z goes offline.

At S508, the leased server sends a notification of being offline successfully to the leased device Z.

Figure 6:
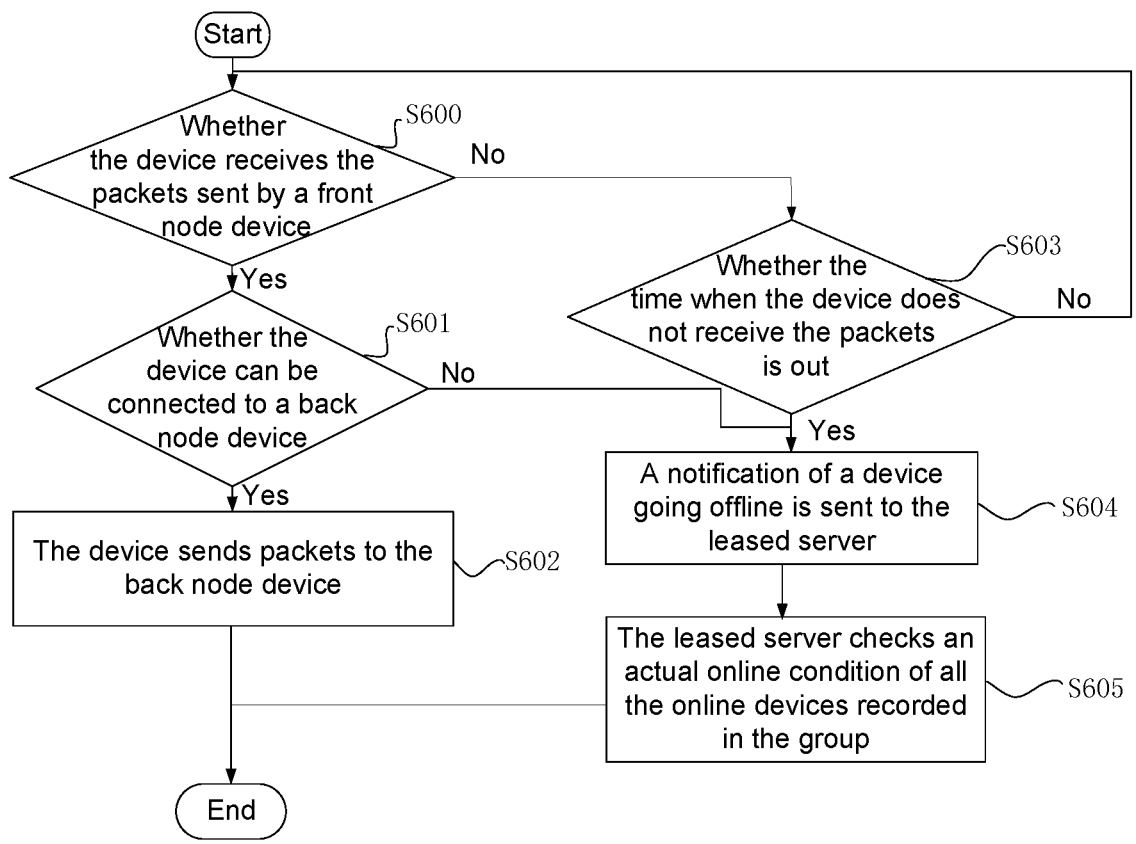
FIG. 6 is a flowchart of a leased device going offline abnormally.

FIG. 6 is a flowchart of a leased device going offline abnormally, specifically including the following steps.

At S600, whether the device receives the packets sent by a front node device; in a case that yes, S601 is executed; in a case that no, S603 is executed.

At S601, whether the device can be connected to a back node device; in a case that yes, S602 is executed; in a case that no, S604 is executed.

At S602, the device sends packets to the back node device; the flow ends.

At S603, whether the time when the device does not receive the packets is out; in a case that yes, S604 is executed; in a case that no, return to S600.

At S604, a notification of a device going offline is sent to the leased server.

At S605, the leased server checks an actual online condition of all the online devices recorded in the group; the flow ends.

Embodiment 3

In order to solve the above technical problems, an embodiment of the present disclosure provides a server.

The server may include a memory device and a controller. The memory device stores a computer program. When executed by the controller, the computer program implements the steps of the Internet of Things device monitoring method described in embodiment 1.

Embodiment 4

In order to solve the above technical problems, an embodiment of the present disclosure provides an Internet of Things device. The Internet of Things device may include a memory and a controller.

The memory stores a computer program. When executed by the controller, the computer program implements the steps of the Internet of Things device monitoring method described in embodiment 2.

Embodiment 5

In order to solve the above technical problems, an embodiment of the present disclosure provides a storage medium.

The storage medium of the present embodiment stores a computer program. When executed by the controller, the computer program implements the steps of the Internet of Things device monitoring method described in embodiment 1 or embodiment 2.

It is understandable that the same or similar parts of the above embodiments may be referred to each other, and those not specified in some embodiments may be referred to the same or similar contents in other embodiments.

It is to be noted that in the description of the present disclosure, terms "first", "second" and the like are used for descriptive purposes only and are not to be construed as indicating or implying relative importance. Further, in the description of the present disclosure, the meaning of "multiple" is at least two unless otherwise specified.

Any process or method in the flowcharts or described herein in another manner may be understood to represent a module, segment or part including codes of one or more executable instructions configured to realize specific logic functions or steps of the process and, moreover, the scope of the preferred implementation mode of the present disclosure includes other implementation, not in a sequence shown or discussed herein, including execution of the functions basically simultaneously or in an opposite sequence according to the involved functions. This should be understood by those skilled in the art of the embodiments of the present disclosure.

It is to be understood that parts of the present disclosure may be realized by hardware, software, firmware or a combination of them. In the above implementation modes, multiple steps or methods can be realized by software or firmware which is stored in a memory and executed by an appropriate instruction execution system. For example, in a case that the parts are realized by hardware, as in another implementation mode, any or a combination of the following technologies known in the field may be used: a discrete logic circuit with a logic gate circuit used to implement logic functions on a data signal, an application-specific integrated circuit with an appropriate combinational logic gate circuit, a Programmable Gate Array (PGA), and a Field Programmable Gate Array (FPGA), etc.

Those of ordinary skill in the art should understand that all or part of the steps in the method of the above embodiment may be completed through related hardware instructed by a program, the program may be stored in a computer-readable storage medium, and when the program is executed, one or combination of the steps of the method embodiment is included.

In addition, each functional unit in each embodiment of the present disclosure may be integrated into a processing module, each unit may also physically exist independently, and two or more than two units may also be integrated into a module. The integrated module may be realized in form of hardware or in form of software function module. In a case that the integrated unit is implemented by software function modules, and the software function modules are sold or used as independent products, they can also be stored in a computer readable storage medium.

The storage media mentioned above may be an ROM, a disk or a compact disc, etc.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the application. In the specification, a schematic representation of the above terms does not necessarily refer to the same embodiment or example. Moreover, the specific described features, structures, materials or characteristics may be combined in a proper manner in any one or more embodiments or examples.

Although the implementation modes disclosed in the present disclosure are as above, the contents are the implementation modes only adopted for facilitating understanding the present disclosure, but not intended to limit the present disclosure. Any skilled in the technical field of the present disclosure may make any modification and change on implementation forms and details without departing from the spirit and scope disclosed by the present disclosure, but the protection scope of the present disclosure is still subject to the scope limited by the claims attached.

What is claimed is:

1. An Internet of Things device monitoring method, comprising:
   acquiring device information of each of a plurality of online Internet of Things devices present in any one of a plurality of constructed Internet of Things device groups;
   generating group ring information according to the device information of each of the plurality of the online Internet of Things devices;
   wherein generating group ring information according to the device information of each of the plurality of the online Internet of Things devices, comprising:
   sorting the online Internet of Things devices by their tag numbers and using sorting result as the group ring information;
   sorting the online Internet of Things devices by their network access times and using sorting result as the group ring information;
   sorting the online Internet of Things devices by their tag numbers and their network access times and using sorting result as the group ring information;
   sending the group ring information to the plurality of the online Internet of Things devices, so that the plurality of the online Internet of Things devices generate an online Internet of Things device ring according to the group ring information;
   in a case that a notification of presence of an offline device sent by any one of the plurality of the online Internet of Things devices in the online Internet of Things device ring, sending offline detection data to each of the plurality of the online Internet of Things devices in the online Internet of Things device ring; and
   determining an actual offline Internet of Things device in the online Internet of Things device ring according to response data corresponding to the offline detection data, and, the actual online Internet of Things device can return response data corresponding to the offline detection data, while the actual offline Internet of Things device cannot return the response data corresponding to the offline detection data.

2. The Internet of Things device monitoring method according to claim 1, further comprising:
   determining an actual online Internet of Things device in the online Internet of Things device ring according to the response data of each of the plurality of the online Internet of Things devices to the offline detection data;
   in a case that the number of the actual online Internet of Things devices is at least two, generating offline regrouping ring information according to the device information of the plurality of the actual online Internet of Things devices; and
   sending the offline regrouping ring information and the device information of the actual offline Internet of Things device to the actual online Internet of Things devices, so that the plurality of the actual online Internet of Things devices eliminate the actual offline Internet of Things device according to the device information of the actual offline Internet of Things device and regrouping a ring according to the offline regrouping ring information.

3. The Internet of Things device monitoring method according to claim 1, further comprising:
   receiving an offline request sent by any one of the plurality of the online Internet of Things devices in the online Internet of Things device ring, and determining a plurality of actual online Internet of Things devices in the online Internet of Things device ring according to the device information of the online Internet of Things device corresponding to the offline request;
   generating offline regrouping ring information according to the device information of the plurality of the actual online Internet of Things devices; and
   sending the offline regrouping ring information and the device information of the plurality of the online Internet of Things devices corresponding to the offline request to the plurality of the actual online Internet of Things devices, so that the plurality of the actual online Internet of Things devices eliminate the plurality of the online Internet of Things devices corresponding to the offline request according to the device information of the plurality of the online Internet of Things devices corresponding to the offline request, and regroup a ring according to the offline regrouping ring information.

4. The Internet of Things device monitoring method according to claim 1, further comprising:
   monitoring an online request sent by any one of the plurality of Internet of Things devices which are monitored, determining the Internet of Things device group to which any one of the plurality of the Internet of Things devices which are monitored belongs according to the device information of any one of the plurality of the Internet of Things devices which are monitored, and converting any one of the plurality of the Internet of Things devices which are monitored into the online Internet of Things device;
   generating amplified regrouping ring information according to the device information of the plurality of the online Internet of Things devices in the Internet of Things device group to which any one of the plurality of the Internet of Things devices which are monitored belongs, so that the plurality of the online Internet of Things devices regroup a ring according to the amplified regrouping ring information.

5. The Internet of Things device monitoring method according to claim 1, wherein the notification of the presence of the offline device is generated when any one of the plurality of the online Internet of Things devices in the online Internet of Things device ring detects that an online Internet of Things device adjacent to the any one of the plurality of the online Internet of Things devices is disconnected.

6. The Internet of Things device monitoring method according to claim 1, wherein a constructing process of the Internet of Things device group comprises:
   receiving a device set sent by each of the plurality of Internet of Things devices which are monitored, wherein the device set comprises the plurality of Internet of Things devices which are monitored corresponding to the device set and other Internet of Things device which is monitored capable of matching each of the plurality of Internet of Things devices which are monitored; and
   according to preset grouping rules, processing the device set corresponding to each of the plurality of Internet of Things devices which are monitored, and dividing all the Internet of Things devices which are monitored into one or more the Internet of Things device groups.

7. The Internet of Things device monitoring method according to claim 1, wherein according to preset grouping rules, processing the device set corresponding to each of the plurality of Internet of Things devices which are monitored, and dividing all the Internet of Things devices which are monitored into one or more the Internet of Things device groups comprises:

according to the preset maximum number of devices M in each of the plurality of the Internet of Things device groups, successively selecting sets which containing M devices, acquire an intersection corresponding to the sets which containing M devices, until all the sets are traversed;

after selecting the intersection satisfying a grouping condition, acquiring one or more the Internet of Things device groups according to a principle of not repeating grouping;

wherein, satisfying the grouping condition is: the intersection corresponding to the sets which containing M devices comprises the Internet of Things device which is monitored corresponding to the sets which containing M devices, where M is an integer and M is greater than or equal to 2.

8. The Internet of Things device monitoring method according to claim 1, wherein the device information of each of the plurality of the online Internet of Things devices comprises at least one of the following: a tag number of each of the plurality of the online Internet of Things devices, network access time of each of the plurality of the online Internet of Things devices.

9. The Internet of Things device monitoring method according to claim 1, wherein after the plurality of the online Internet of Things devices generate the online Internet of Things device ring according to the group ring information, the Internet of Things device monitoring method further comprises:

randomly selecting one of the online Internet of Things devices as a starting online Internet of Things device, and periodically sending state report data by the starting online Internet of Things device;

in a case that the state report data sent by the starting online Internet of Things device is not received, and the notification of the presence of the offline device is not received, determining that all the online Internet of Things devices in the online Internet of Things device ring are converted into offline Internet of Things devices.

10. An Internet of Things device monitoring method, comprising:

receiving, by each of a plurality of online Internet of Things devices present in any one of a plurality of constructed Internet of Things device groups, group ring information sent by a server;

and, the online Internet of Things devices are sorted by at least one of the following: the tag number, the network access time, and a sorting result is used as the group ring information;

generating, by each of the plurality of online Internet of Things devices, an online Internet of Things device ring according to the group ring information;

detecting, by any one of the plurality of the online Internet of Things devices in the online Internet of Things device ring, whether an online Internet of Things device adjacent to any one of the plurality of the online Internet of Things devices is disconnected or connected, and in a case that it is disconnected, generating a notification of presence of an offline device;

sending, by any one of the plurality of the online Internet of Things devices, the notification of the presence of the offline device to the server, so that the server sends offline detection data to each of the plurality of the online Internet of Things devices in the online Internet of Things device ring, and determines an actual offline Internet of Things device in the online Internet of Things device ring according to response data corresponding to the offline detection data, and the actual online Internet of Things device can return response data corresponding to the offline detection data, while the actual offline Internet of Things device cannot return the response data corresponding to the offline detection data.

11. A server, comprising: a memory device and a controller;

the memory device stores a computer program; when executed by the controller, the computer program implements steps of the Internet of Things device monitoring method, wherein the Internet of Things device monitoring method comprises:

acquiring device information of each of a plurality of online Internet of Things devices present in any one of a plurality of constructed Internet of Things device groups;

generating group ring information according to the device information of each of the plurality of the online Internet of Things devices;

wherein generating group ring information according to the device information of each of the plurality of the online Internet of Things devices comprising:

sorting the online Internet of Things devices by their tag numbers and using sorting result as the group ring information;

sorting the online Internet of Things devices by their network access times and using sorting result as the group ring information;

sorting the online Internet of Things devices by their tag numbers and their network access times and using sorting result as the group ring information;

sending the group ring information to the plurality of the online Internet of Things devices, so that the plurality of the online Internet of Things devices generate an online Internet of Things device ring according to the group ring information;

in a case that a notification of presence of an offline device sent by any one of the plurality of the online Internet of Things devices in the online Internet of Things device ring, sending offline detection data to each of the plurality of the online Internet of Things devices in the online Internet of Things device ring; and determining an actual offline Internet of Things device in the online Internet of Things device ring according to response data corresponding to the offline detection data, and the actual online Internet of Things device can return response data corresponding to the offline detection data, while the actual offline Internet of Things device cannot return the response data corresponding to the offline detection data.

12. The server according to claim 11, further comprising:

determining an actual online Internet of Things device in the online Internet of Things device ring according to the response data of each of the plurality of the online Internet of Things devices to the offline detection data;

in a case that the number of the actual online Internet of Things devices is at least two, generating offline regrouping ring information according to the device information of the plurality of the actual online Internet of Things devices; and sending the offline regrouping ring information and the device information of the actual offline Internet of Things device to the actual online Internet of Things devices, so that the plurality of the actual online Internet of Things devices eliminate the actual offline Internet of Things device according to the device information of the actual offline Internet of Things device and regrouping a ring according to the offline regrouping ring information.

13. The server according to claim 11, further comprising:
receiving an offline request sent by any one of the plurality of the online Internet of Things devices in the online Internet of Things device ring, and determining a plurality of actual online Internet of Things devices in the online Internet of Things device ring according to the device information of the online Internet of Things device corresponding to the offline request;
generating offline regrouping ring information according to the device information of the plurality of the actual online Internet of Things devices; and
sending the offline regrouping ring information and the device information of the plurality of the online Internet of Things devices corresponding to the offline request to the plurality of the actual online Internet of Things devices, so that the plurality of the actual online Internet of Things devices eliminate the plurality of the online Internet of Things devices corresponding to the offline request according to the device information of the plurality of the online Internet of Things devices corresponding to the offline request, and regroup a ring according to the offline regrouping ring information.

14. The server according to claim 11, further comprising:
monitoring an online request sent by any one of the plurality of Internet of Things devices which are monitored, determining the Internet of Things device group to which any one of the plurality of the Internet of Things devices which are monitored belongs according to the device information of any one of the plurality of the Internet of Things devices which are monitored, and converting any one of the plurality of the Internet of Things devices which are monitored into the online Internet of Things device;
generating amplified regrouping ring information according to the device information of the plurality of the online Internet of Things devices in the Internet of Things device group to which any one of the plurality of the Internet of Things devices which are monitored belongs, so that the plurality of the online Internet of Things devices regroup a ring according to the amplified regrouping ring information.

15. The server according to claim 11, wherein the notification of the presence of the offline device is generated when any one of the plurality of the online Internet of Things devices in the online Internet of Things device ring detects that an online Internet of Things device adjacent to the any one of the plurality of the online Internet of Things devices is disconnected.

16. The server according to claim 11, wherein a constructing process of the Internet of Things device group comprises:
receiving a device set sent by each of the plurality of Internet of Things devices which are monitored, wherein the device set comprises the plurality of Internet of Things devices which are monitored corresponding to the device set and other Internet of Things device which is monitored capable of matching each of the plurality of Internet of Things devices which are monitored; and
according to preset grouping rules, processing the device set corresponding to each of the plurality of Internet of Things devices which are monitored, and dividing all the Internet of Things devices which are monitored into one or more the Internet of Things device groups.

17. The server according to claim 11, wherein according to preset grouping rules, processing the device set corresponding to each of the plurality of Internet of Things devices which are monitored, and dividing all the Internet of Things devices which are monitored into one or more the Internet of Things device groups comprises:
according to the preset maximum number of devices M in each of the plurality of the Internet of Things device groups, successively selecting sets which containing M devices, acquire an intersection corresponding to the sets which containing M devices, until all the sets are traversed;
after selecting the intersection satisfying a grouping condition, acquiring one or more the Internet of Things device groups according to a principle of not repeating grouping;
wherein, satisfying the grouping condition is: the intersection corresponding to the sets which containing M devices comprises the Internet of Things device which is monitored corresponding to the sets which containing M devices, where M is an integer and M is greater than or equal to 2.

18. The server according to claim 11, wherein the device information of each of the plurality of the online Internet of Things devices comprises a tag number each of the plurality of the online Internet of Things devices or network access time of each of the plurality of the online Internet of Things devices or the tag number and the network access time of each of the plurality of the online Internet of Things devices.

19. The server according to claim 11, wherein after the plurality of the online Internet of Things devices generate the online Internet of Things device ring according to the group ring information, the Internet of Things device monitoring method further comprises:
randomly selecting one of the online Internet of Things devices as a starting online Internet of Things device, and periodically sending state report data by the starting online Internet of Things device;
in a case that the state report data sent by the starting online Internet of Things device is not received, and the notification of the presence of the offline device is not received, determining that all the online Internet of Things devices in the online Internet of Things device ring are converted into offline Internet of Things devices.

* * * * *